March 25, 1958  E. S. KUCHINSKIE  2,828,035
AUTOMOBILE ROOF MOUNTED CARRIER
Filed July 11, 1956
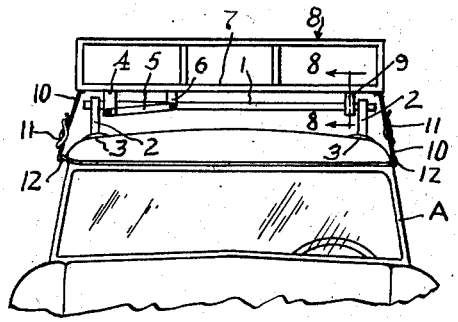
Fig. 1
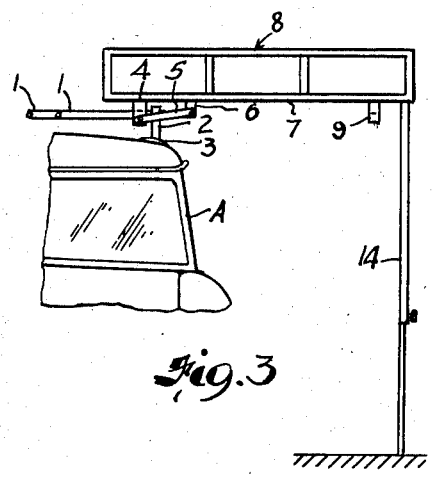
Fig. 3
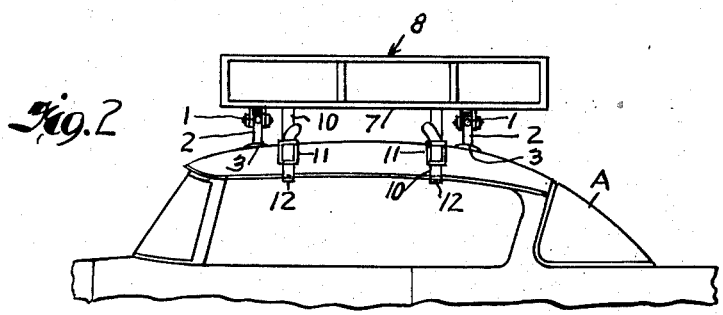
Fig. 2
Fig. 8
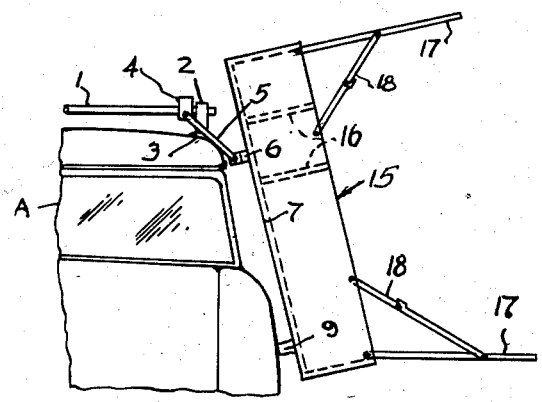
Fig. 4
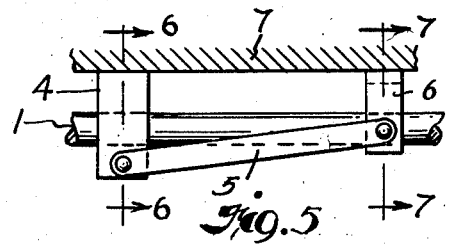
Fig. 5 / Fig. 6
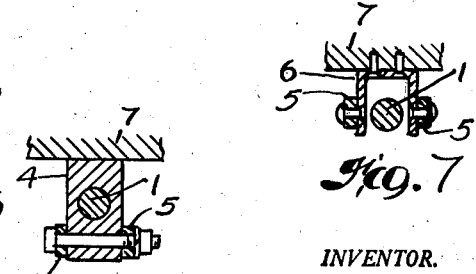
Fig. 7
INVENTOR.
EDWARD S. KUCHINSKIE
BY
Oberlin & Limbach
ATTORNEYS.

2,828,035

AUTOMOBILE ROOF MOUNTED CARRIER

Edward S. Kuchinskie, Painesville, Ohio

Application July 11, 1956, Serial No. 597,247

2 Claims. (Cl. 214—450)

The present invention relates generally as indicated to an automobile roof mounted carrier and has for one of its principal objects the provision of a carrier which is shiftably mounted to facilitate loading and unloading as in the case of a luggage carrier and which when shifted is usable as an awning or as a tent roof supported by the car roof and by a prop.

It is another object of this invention to provide a carrier of the character indicated which may be swung downwardly to a generally vertical position for convenience in use as when the carrier comprises a cupboard containing camping supplies or the like.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a front elevation view showing the carrier herein as mounted on the roof of an automobile;

Fig. 2 is a side elevation view as viewed from the right-hand side of Fig. 1;

Fig. 3 is a front elevation view like Fig. 1 except illustrating the carrier herein shifted laterally and supported by a prop;

Fig. 4 is a front elevation view showing a carrier in the form of a camping supply cupboard swung down to generally vertical position along one side of the car body;

Fig. 5 is a front elevation view on enlarged scale showing the link mechanism by which the carrier is supported on the car roof;

Figs. 6 and 7 are cross-section views taken along the lines 6—6 and 7—7, Fig. 5, respectively; and Fig. 8 is a cross-section view on enlarged scale taken substantially along the line 8—8, Fig. 1.

Referring now more particularly to the drawing, the reference numerals 1, 1 denote a pair of bars which are adapted to be mounted across the roof of an automobile A in generally horizontally extending relation and parallel to each other. Each bar 1 is provided with supports 2 adjacent its ends equipped with rubber cups 3 or the like.

Each bar 1 has slidably mounted thereon a block 4, said block 4 being connected as by a pair of links 5 to a fitting 6 which is secured on the base 7 of the carrier device 8. The carrier device 8 is shown in Figs. 1-3 as comprising a luggage rack having upstanding sides and ends.

Adjacent the opposite side of the base 7 there are secured support blocks 9 which are recessed as best shown in Fig. 8 to rest on the respective bars 1 at points inwardly adjacent the supports 2.

The carrier device 8 is firmly held in place as by means of flexible straps 10 which are secured to the base 7 at opposite sides and which straps are provided with buckles 11 and hooks 12, the latter being engaged under the gutters or molding strips which extend longitudinally along the opposite sides of the car roof.

When it is desired to load or unload the carrier 8, the straps 10 are unbuckled or unhooked whereupon the right-hand side of the carrier 8 as viewed in Fig. 1 may be raised and shifted to the right as shown in Fig. 3, a prop 14 which is adjustable in length being positioned under the overhanging side of the carrier 8. With the carrier 8 thus shifted, loading and unloading thereof is facilitated.

However, if desired, the carrier 8 may be allowed to swing downwardly about the pivotal connections of the links 5 to the blocks and supports 4 and 6, and preferably the links 5 are arranged to engage the rubber cups 3 so as to preclude the possibility of marring the finish of the car roof. Furthermore, the support blocks 9 may be made of rubber or rubber-like material or at least be provided with rubber pads to engage the lower side portion of the car body or doors.

The structure illustrated in Fig. 4 is substantially the same as that illustrated in Figs. 1-3 except that the carrier herein, that is in Fig. 4, is in the form of a camping cupboard 15 which is equipped with shelves 16 to which access is provided by hinged doors 17 which are held open by toggle links 18. Preferably, the bottom door 17 swings to generally horizontal position so that it may be used as a table.

Other modes of applying the principle of the invention may be employed, change being made as regards the details described, provided the features stated in any of the following claims or the equivalent of such be employed.

I therefore particularly point out and distinctly claim as my invention:

1. In combination, a pair of bars provided adjacent their ends with downwardly extending supports having suction cups for supporting said bars in parallel generally horizontally extending relation across the roof of an automobile; a carrier device; a sliding block embracing each bar for longitudinal sliding therealong between said supports; links extending inwardly of the corresponding side of the roof and said device and pivotally connected at their ends to said sliding blocks and to said device about generally horizontal axes that are transverse to said bars; said device carrying blocks adjacent its opposite side which rest upon said bars and which, together with said sliding blocks, support said device on said bars; and clamping means secured to opposite sides of said device and adapted to releasably engage the opposite sides of the roof to hold said device and said bars in fixed position on the roof, the blocks that are carried by said device being movable out of engagement with said bars whereby, upon release of said clamping means, said device may be shifted laterally of the automobile while one side is supported by said sliding blocks and may be swung down alongside the automobile about the pivotal connections of said links with said device and said sliding blocks.

2. The combination of claim 1 wherein the blocks carried by said device and the adjacent supports are vertically overlapped so as to require raising of that side of said device over the adjacent support when it is desired to shift said device laterally as aforesaid.

References Cited in the file of this patent

UNITED STATES PATENTS

| | | |
|---|---|---|
| 2,395,173 | Dobler | Feb. 19, 1946 |
| 2,506,421 | Hacker et al. | May 2, 1950 |